Patented Aug. 22, 1933

1,923,406

UNITED STATES PATENT OFFICE 1,923,406

METHOD OF MAKING METALLIC FILMS UPON BODIES OF NONCONDUCTING OXIDES, ESPECIALLY FOR OXIDE FILAMENTS IN DISCHARGE TUBES

Erich Wiegand, Hohen-Neuendorf near Berlin, Germany, assignor to Telefunken Gesellschaft fur Drahtlose Telegraphie mit beschrankter Haftung, Berlin, Germany, a Corporation of Germany No Drawing. Application March 30, 1927, Serial No. 179,721, and in Germany April 1, 1926

7 Claims. (Cl. 250—27.5)

The present method of applying metallic coats or films upon non-conducting oxide bodies involves a number of serious drawbacks. The process in the majority of cases consists in applying a conducting coat of graphite or silver film by mechanical or chemical means which is thereupon reinforced to the desired thickness by electrolytic means. However, with the majority of the metals, it is difficult to secure by this process firmly adhering films. Again, special precautionary measures must be adopted whenever oxides which react easily with water, such as barium oxide, calcium oxide, etc. are to be coated with metals by this process.

The second method which is free from the drawbacks enumerated above is by the cathode spattering or disintegration method. This method, however, operates very slowly and in fact often takes days before a film of adequate thickness has been obtained.

Due to the objections mentioned attempts have been made to apply metallic powder, which has been prepared or digested to form a paste, upon the oxide bodies and to cause the metal to sinter firmly upon the carrier by heating the said bodies. However, it was found that after heating, the oxide bodies showed only extremely low resistance or strength with the result that it precluded their practical use for most purposes. The coats also exhibited great tendency to scale off which is probably due to water entering the pores of the oxide body, reacting with the oxide, and thereby loosening the texture. The same difficulty manifests itself when other common liquids, such as alcohol, etc., which do not react with the oxide to any great extent, are used. It must be supposed, then, that the loosening or breaking-up of the film is caused by the evaporation of the liquid inside the pores of the oxide body.

All of the above mentioned drawbacks can be obviated if a liquid possessing high viscosity such as paraffin oil, etc. is employed in the preparation of the paste which contains the comminuted metal. This paste, when applied, will enter only the top stratum of the oxide body. The film produced by the use of this paste adheres so firmly upon the oxide carrier or substratum that they can be worked mechanically just like solid metal pieces, while the oxide body itself is not impaired in its original strength. For some purposes such as the making of molybdenum coats upon tantalum oxide, it has been found to be of great advantage to use a sugar solution in preparing and digesting the paste. The sugar upon being heated changes to carbon which reacts with the metal in the paste as well as with the oxide body and forms an electrically conducting carbide. In this manner a firm union between the metal coat and the oxide substratum is obtained.

The method to be followed in making the films or coats is very simple. The metal being in the form of a highly comminuted powder is intimately mixed with the very viscous liquid until a homogeneous paste is obtained. The latter is thereupon spread upon the oxide body so that a coat of requisite thickness is obtained. The oxide body is then heated to the sintering or compacting temperature of the metal which fuses into a thin firmly adhering film. In cases where oxidizable metals such as iron, nickel, etc. are used, the sintering process must be affected in a hydrogen atmosphere or in other gases which will not attack the metal.

Metallic films made in this manner have proved a particularly great success in the case of oxide cathodes or filaments in discharge tubes. The slender non-conducting oxide tube is coated with metal in the beforementioned manner over which a second coating of a highly emissive material is formed.

What I claim is:

1. The method of making metal films upon porous, electrically non-conducting oxide bodies, which comprises forming a paste by mixing a highly comminuted metal with a sufficiently viscous sugar solution which reacts with both the metal and the oxide body at high temperatures to form a conducting compound, spreading the paste upon the oxide body, and then heating the coated oxide body to a sintering temperature.

2. The method of making metal films upon porous electrically non-conducting oxide bodies, which comprises forming a homogeneous paste by mixing a highly comminuted metal with a carbonaceous fluid, spreading the paste upon the oxide body, heating the coated oxide body to a sintering temperature, and thereafter applying a coating of an electron-limiting material.

3. The method of making metal films upon a porous non-conducting oxide body, which comprises forming a paste by mixing highly comminuted molybdenum with a carbonaceous fluid having a viscosity at least that of paraffin oil, spreading said paste upon the oxide body, heating the covered oxide body to a sintering temperature thereby causing the molybdenum to sinter onto the oxide body, and thereafter applying a coating of an electron-emitting material.

4. The method of making metal films upon a porous tantalum oxide body, which comprises forming a paste by mixing a highly comminuted metal with a fluid having at least the viscosity of paraffin oil, spreading said paste upon the oxide body, heating the covered tantalum oxide body to a sintering temperature thereby causing the metal to sinter onto the oxide body, and thereafter applying a coating of an electron-emitting material.

5. The method of making metal films upon a porous tantalum oxide body, consisting in forming a paste by mixing highly comminuted molybdenum with a carbonaceous fluid having a viscosity at least that of paraffin oil, spreading said paste upon the tantalum oxide body, heating the covered oxide body to a sintering temperature thereby causing the molybdenum to sinter firmly onto the porous tantalum oxide body, and thereafter applying a coating of an electron-emitting material.

6. An electrical conductor which is subject to heat, comprising a non-conducting oxide core, a metal coating covering said oxide core, and a carbide of the metal coating and the oxide core intermixed with the metallic coating and the surface of the oxide core.

7. An electrical conductor which is subject to heat, comprising an electrically non-conducting oxide core, an electrically conducting coating upon said core consisting of the carbide of a metal and the carbide of the oxide core, and a coating consisting of an electron-emitting material.

ERICH WIEGAND.